Figure 1:
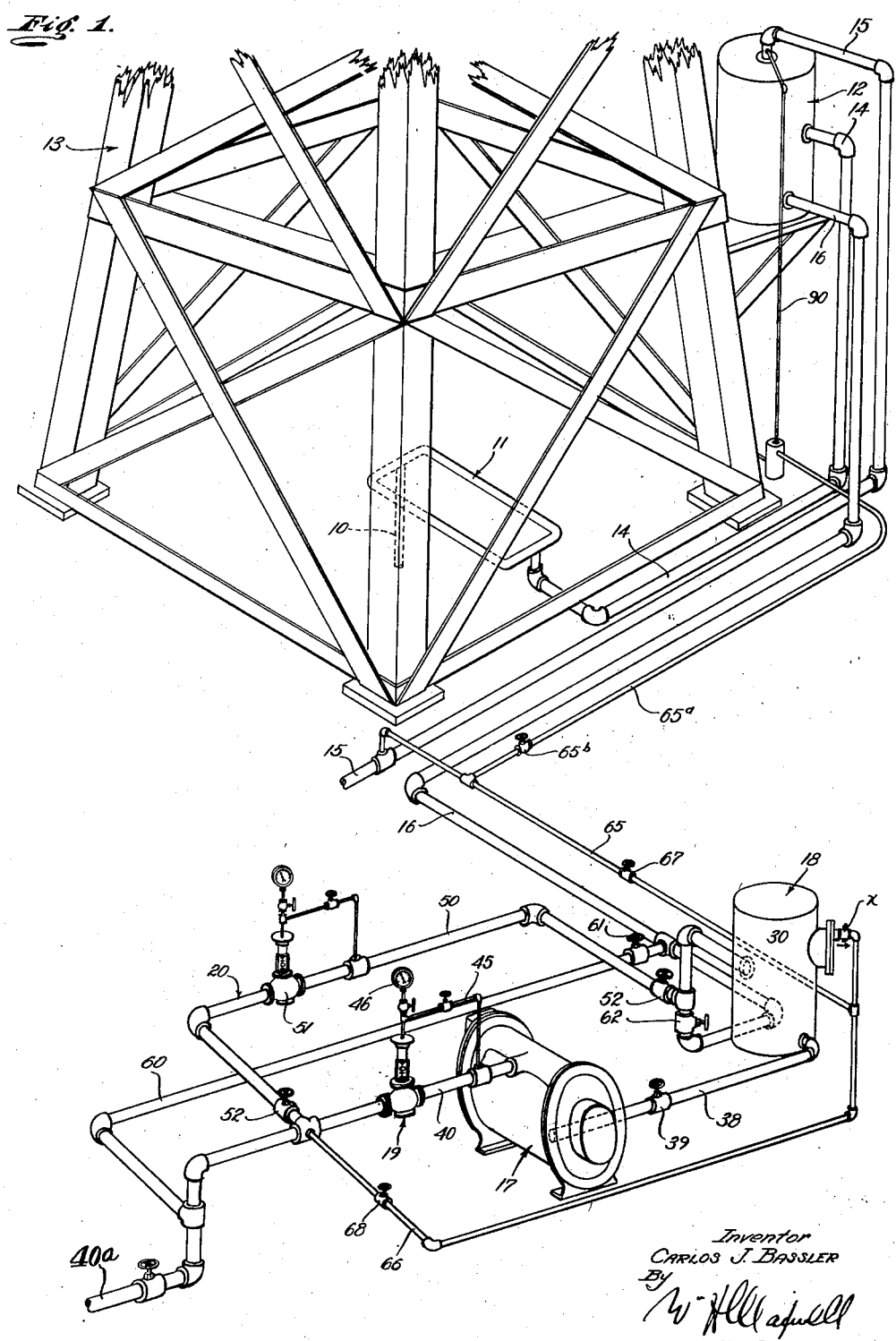

Nov. 2, 1937.  C. J. BASSLER  2,097,829
APPARATUS FOR MEASURING OIL OR THE LIKE
Original Filed Feb. 20, 1934  2 Sheets-Sheet 1

Inventor
CARLOS J. BASSLER
By
W. H. Caldwell
His Attorney

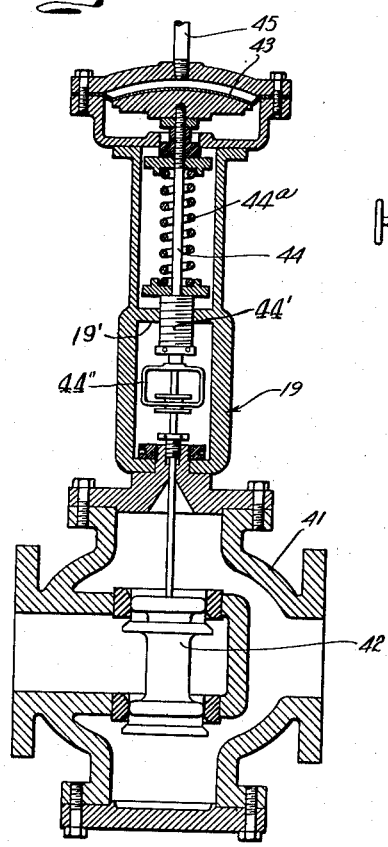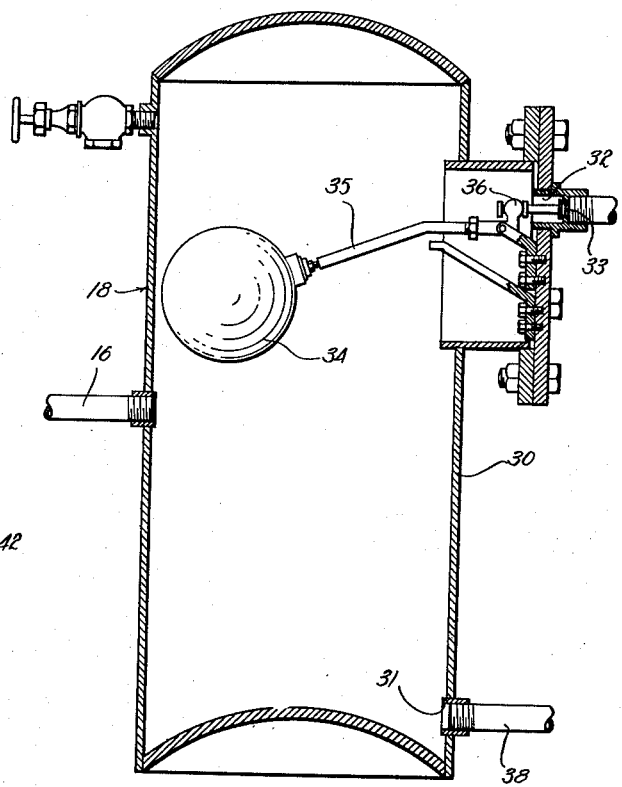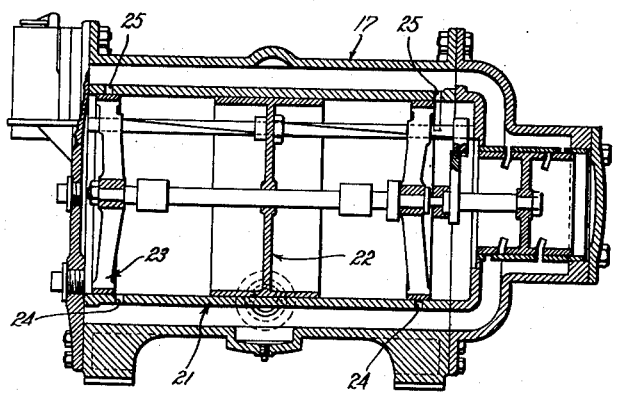

Patented Nov. 2, 1937

2,097,829

UNITED STATES PATENT OFFICE 2,097,829

APPARATUS FOR MEASURING OIL OR THE LIKE

Carlos J. Bassler, Alhambra, Calif., assignor to American Liquid Meter Company, Alhambra, Calif., a corporation of Washington Application February 20, 1934, Serial No. 712,166
Renewed September 29, 1936

4 Claims. (Cl. 73—199)

This invention relates to the measurement of fluid, and has particular reference to the measurement of oil as it is produced at a well. It is a general object of the present invention to provide apparatus by which oil can be effectively and accurately measured by means of a displacement type of meter or any other type of liquid meter of high efficiency.

Oil, as it comes from a well, contains gas or liquids that volatilize at atmospheric pressures or at the pressure at which the oil is usually handled. This is particularly true in the case of flowing wells where the oil is under pressure and in the case of wells employing a gas lift or pump. It is common to pass the oil from a flowing well through a separator designed to separate the oil and gas or readily volatile values of the oil. Oil and gas separators are operated at various pressures or with various back pressures, and in some cases several separators are connected in series. In practically every case a certain amount of gas or readily volatile liquids left in the oil have materially interfered with the measurement of the oil by meters; in fact, reasonably accurate measurement of such oil with displacement type meters has not heretofore been accomplished.

Previously, liquid meters were placed in an oil line without any provision for maintaining sufficient pressure between the meter and the oil source to preserve the oil in the liquid phase so that liquid only would be metered. The high volatile liquids would flash into the gaseous phase before reaching the meter and, upon passing through the meter would be recorded as liquid causing in some instances errors of large magnitude. Measuring of high pressure oils under such conditions discouraged the use of meters and caused retrocession to the tank and gauge means of measurement.

In the present invention, means is provided to maintain a back-pressure upon the oil being metered so as to preserve the oil and its constituents in a liquid state as far as possible. Means are provided, however, to eliminate as much of the gas as possible which accompanies the oil from the well, but some entrained gas may reach the meter. Such entrained gas which may remain with the oil would be of little moment for the reason that it would be under relatively high pressure and compressed to small insignificant volumes. Errors resulting from such entrained gas would be well within that permitted by the industry.

It is an object of this invention to provide apparatus for measuring oil from a well so that a small amount of volatile liquid that may be contained in the oil will not make the measurements inaccurate.

It is another object of the invention to provide apparatus of the character mentioned employing a displacement type meter for measuring the oil.

It is a further object of this invention to relate a displacement meter, a gas eliminator, and a back pressure valve in combination, so that a liquid carrying some gas may be accurately measured without the gas interfering with the action of the meter.

The various objects and features of my invention will be best and more fully understood from the following detailed description of a typical form and application of the invention, throughout which description reference is had to the accompanying drawings, in which:

Fig. 1 is a diagrammatic view illustrating the present invention as it may be applied to a typical oil well. Fig. 2 is a vertical detailed sectional view of the pressure regulating valve for the meter. Fig. 3 is an enlarged vertical detailed sectional view of the gas eliminator employed in carrying out the invention, and Fig. 4 is a longitudinal detailed sectional view of a displacement meter that may be employed in carrying out the invention.

The present invention provides an apparatus including a displacement meter, and is particularly useful in handling oil which contains some gas or some readily volatile liquids which would interfere with the accurate operation of a displacement meter. The invention can be used to advantage in measuring oil from a flowing well, and therefore I will proceed with a description of the invention as it has been applied to a flowing well.

In the case of an ordinary flowing oil well, the oil flowing from the well through a casing 10 is passed through an assembly of control fittings 11 ordinarily known as a "Christmas tree," and then is passed through one or more separators 12. The Christmas tree 11 is represented diagrammatically in Fig. 1, and the separator 12 is shown supported by the derrick 13 at a point above the derrick floor. A line 14 conducts the fluid from the Christmas tree 11 to the separator 12. A gas line 15 is connected with the upper part of the separator to carry off the gas separated from the oil, and an oil line 16 conducts the oil away from the separator. Separators are usually designed to operate under a certain pressure, and, where the well flows under a high pressure and the flow has a high gas content, a series of separators are used.

It is found in practice to be undesirable to pass the fluid from a well through a meter until substantially all of the gases and readily volatile liquids have been removed. The fluid or oil however, delivered from the well or from a separator, which forms a part of the well equipment, passing through the line 16 usually contains some gas and some liquid that will readily volatilize upon a drop of pressure or a slight increase in temperature.

The measuring apparatus provided by the present invention includes, in general, a displacement meter 17, a gas eliminator 18, a pressure regulating valve 19 for the meter which controls the passage of fluid to a yard line 40A, and an automatic by-pass 20 connected around the gas eliminator 18, the meter 17, and the regulator 19. The present invention is not concerned with the details of any of the elements just referred to, but resides in the arrangement of these elements, as will be hereinafter described.

The displacement meter 17 illustrated in the drawings is of the piston type and includes, generally, a cylinder 21, a piston 22 mounted for reciprocation in the cylinder 21, valves controlling the flow of fluid through inlet and outlet ports 24 and 25, respectively, at the ends of the cylinder, and various other parts and features found in such mechanisms.

The particular meter illustrated in the drawings is of the type and construction which is more fully set forth and claimed in my Patent No. 1,886,364 for Displacement meter, granted November 8, 1932. As far as the broader principles of the present invention are concerned, various types of meters may be used in carrying out the invention; therefore, I am not setting forth the details of the particular meter illustrated. It will be obvious that the head or pressure of the fluid being measured operates the piston 22 in the cylinder 21 so that there is a slight drop in pressure across the meter, i. e., between the inlet side of the meter and the outlet side of the meter.

The gas eliminator employed in the invention is designed to remove free gas from the fluid to be measured and, in accordance with the invention, is located to pass the fluid to be measured immediately before the fluid enters the displacement meter 17. The gas eliminator illustrated in the drawings includes, generally, a tank-like body 30 having an opening through which the fluid to be measured is introduced.

In the drawings I have shown the line 16 connected into the body of the gas eliminator at about the middle of the body, i. e., at a point about half way between the top and the bottom of the body. A liquid outlet opening 31 is provided near the bottom of the body 30 and a gas outlet opening 32 is provided near the top of the body. The gas outlet 32 is controlled by a valve 33 operable by a float 34 located in the body 30. The float 34 is carried on an arm 35 which is connected with the valve 33 through a lever 36. The parts are designed so that the weight of the float opens the valve 33. As liquid fills in the body 30, the float is moved upwardly, causing the valve 33 to be moved toward the closed position so that pressure develops in the gas eliminator, thus putting pressure on the liquid discharging from the bottom of the eliminator through the outlet opening 31. In practice, the gas eliminator 18 is not designed to handle large volumes of gas, but is merely to remove gas, such as may be carried in the oil and freely separable therefrom as the oil reaches the displacement meter.

A pipe or like connection 38 joins the liquid outlet 31 of the gas eliminator with the inlet of the meter 17. In practice, the gas eliminator and meter are closely coupled, i. e., the gas eliminator is connected immediately ahead of the meter. I have shown a manually operated control valve 39 in the pipe connection 38.

The pressure regulator 19 is connected with the outlet of the meter 17, for instance, it may be connected in the pipe 40 provided for conducting the fluid from the meter. In practice, any suitable pressure regulating valve may be employed in carrying out the invention. I have shown a valve 19 connected in the outlet pipe 40 including a body 41, a valve element 42 controlling flow through the body, and a diaphragm type valve control device 43 for operating the valve 42 through a suitable stem 44. A spring 44ª resists movement of the diaphragm device 43. A pressure line 45 is connected between the meter side of the regulating valve and the diaphragm device so that the opening of the valve 42 is determined by the pressure on the outlet side of the meter, the apparatus being regulated so that the diaphragm device 43 operates the valve 42 to maintain the desired back pressure on the meter. In practice, a pressure gauge 46 may be connected with the regulating valve 19 so that an operator can readily determine the pressure on the outlet side of the meter 17.

Valve 19 (also valve 51) as shown in Figure 2, is adjusted by turning the screw 44' so as to vary the compression of the spring 44ª. Said screw is threaded into the valve partition 19' and may be readily turned by rotating the loop 44''. From this description, it is obvious, that the compression of the spring 44ª can be adjusted so as to predetermine at what pressure upon the element 43 will open the valve elements 42.

The automatic by-pass 20 is provided as a connection around the gas eliminator 18, the meter 17, and the regulating valve 19. The by-pass includes a pipe 50 connected with the pipe 16 ahead of the gas eliminator and connected with the outlet pipe 40 beyond the regulating valve 19. A pressure regulator or relief valve 51 is provided in the pipe 50, and in practice manually operable control valves 52 are provided in the pipe 50 at each side of the relief valve 51. The relief valve may be an ordinary pop valve or safety valve designed to open upon pressure in the pipe 50 from the pipe 16 exceeding a predetermined value. Under normal operating conditions, the valve 51 remains closed.

In practice, a manually controlled by-pass is provided around all of the measuring apparatus above described. This by-pass may include a pipe 60 connected with the pipe 16 ahead of the point of connection of the pipe 50 with the pipe 16 and connected with the outlet pipe 40 beyond the point of connection of the pipe 50 with the outlet pipe 40. The pipe 60 may be provided with a manually operable control valve 61 so that the manual by-pass can be opened whenever desired. When the manually controlled by-pass is employed, a manually operated stop valve 62 is provided in the pipe 16 between the points where the pipes 50 and 60 connect with the pipe 16.

The gas outlet opening 32 of the gas eliminator 18 may be connected with the gas outlet line 15 from the separator of the well or with the outlet pipe 40 from the meter, or both. In the drawings I have illustrated both connections. A pipe 65 connects the gas outlet from the eliminator 18 to the gas outlet pipe 15 of the separator at the well, while a pipe 66 makes the connection with the outlet pipe 40 beyond the regulating valve 19. Pipe lines 65 and 66 may be used at the same time. This may be necessary when it is desirable to return only a portion of the gas to the oil after metering, the balance to be taken by the gas line 15 which leads to a gas storage reservoir. Suitable manually operable control valves 67 and 68 are provided in the pipes 65 and 66, respectively. A suitable check valve X may be provided in the pipe 65. In the arrangement illustrated, a pipe 65ª connects the pipe 65 with a bleeder line 90 from the gas outlet of the separator or at the well, the bleeder line 90 being in communication with gas line 15. A valve 65ᵇ is provided in the line 65ª.

In operation, the oil coming from the well, after having passed through Christmas tree 11 and the separator 12, enters the gas eliminator 18 which operates to remove any small amount of gas that may be in the oil after it reaches the measuring apparatus. The oil passing from the gas eliminator 18 flows directly into the meter 17 and from the meter through the regulating valve 19. The regulating valve 19 is adjusted or set so that there is just sufficient drop of pressure across the meter to allow it to function and, therefore, the tendency for gas to be liberated within the meter is minimized. The liberation of gas within the meter 17 is likewise reduced through the close coupling of the gas eliminator 18 and the meter. In the event of a surge or sudden increase in pressure in the pipe 16, the automatic by-pass will operate to relieve such pressure, preventing damage to the apparatus. By holding pressure on the fluid as it passes through the meter, the gas or volatile elements are held in the fluid. In handling fluid from a well it is preferred to locate the meter below the separator 12 so that the fluid passed by the separator is held under a head pressure that prevents escape of the gas or volatile elements.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. In combination, a gas-liquid separator receiving the fluid produced by an oil well, a meter, a gas eliminator connected with the separator and having means to pass liquid to the meter, a pressure regulator controlling the passage of fluid from the meter to a yard pipe line, said regulator being adjustable to vary the back-pressure through the meter but, removed from the meter, and a by-pass bridging the eliminator, meter and regulator, an adjustable valve in the by-pass, the opening of which is dependent upon a predetermined pressure in advance of the eliminator.

2. In an oil flow system; a gas eliminator, meter and back pressure valve, means to conduct oil from a source to the gas eliminator, the meter and back pressure valve having duct connections with the eliminator for passage of oil, a pipe line to receive the oil from the valve of said connected parts, duct means to carry gas from the eliminator to the pipe line, an automatically valve-controlled by-pass connected to the first means and said pipe line to pass dangerously high pressure oil around all of said parts.

3. In an oil flow line, a liquid-gas separator having a gas take-off pipe and a pipe connected to a source of oil to be measured, a gas eliminator, an oil outlet from the separator to the gas eliminator, a meter connected to a liquid outlet of the eliminator, an adjustable back-pressure valve connected to an outlet of the meter, a yard pipe line, the outlet of the valve being in connection with the yard pipe line, valved gas removal ducts from the eliminator connected to said gas take-off pipe end, to said yard pipe line to return the gas to the liquid after its measurement.

4. In combination, apparatus receiving the fluid produced by an oil well including a separator receiving the fluid produced and adapted to separate the liquid and gas, a liquid line conducting liquid from the separator including a gas eliminator receiving fluid from said line, a displacement meter receiving liquid from the gas eliminator, a pressure regulator passing liquid from the meter, and a by-pass around the gas eliminator, meter, and pressure regulator, the by-pass including a valve adapted to open at a predetermined pressure, the valve being under the control of the pressure in the line ahead of the gas eliminator to prevent damage to the meter and eliminator.

CARLOS J. BASSLER.